United States Patent [19]

Moen

[11] 4,319,735

[45] Mar. 16, 1982

[54] FAUCET VALVES

[75] Inventor: Alfred M. Moen, Grafton, Ohio

[73] Assignee: Stanadyne, Inc., Windsor, Conn.

[21] Appl. No.: 171,130

[22] Filed: Jul. 22, 1980

[51] Int. Cl.³ .......................... F16K 5/04; F16K 5/18
[52] U.S. Cl. .................................... 251/175; 251/288;
251/310; 251/317; 251/DIG. 1
[58] Field of Search ............... 251/309, 310, 316, 317,
251/285, 288, DIG. 1, 175, 192, 310

[56] References Cited

U.S. PATENT DOCUMENTS

| | | | |
|---|---|---|---|
| 2,256,416 | 9/1941 | Stockstill | 251/310 |
| 2,371,657 | 3/1945 | Stark | 251/310 |
| 2,845,248 | 7/1958 | Fuglie | 251/192 |
| 3,497,179 | 2/1970 | Smyers, Jr. | 251/317 |
| 3,814,120 | 6/1974 | Moen | 251/288 |
| 4,004,775 | 1/1977 | Jones et al. | 251/310 |
| 4,015,816 | 4/1977 | Semon | 251/288 |
| 4,275,868 | 6/1981 | Crone | 251/310 |

*Primary Examiner*—H. Jay Spiegel
*Attorney, Agent, or Firm*—Kinzer, Plyer, Dorn & McEachran

[57] ABSTRACT

A valve structure for use in a two handle faucet environment includes a sleeve and a valve member positioned within the sleeve and rotatable therein. The sleeve has an inlet and an outlet and a path of flow therebetween. The valve member has an opening which is used to connect the inlet and outlet and thus form a part of the path of flow. An annular seal member is fixed on the valve member and spaced from the opening, which seal member is used to close off communication between the inlet and outlet. At no time is the path of flow through the seal member, thus preventing any excessive pressures being applied to the seal.

13 Claims, 11 Drawing Figures

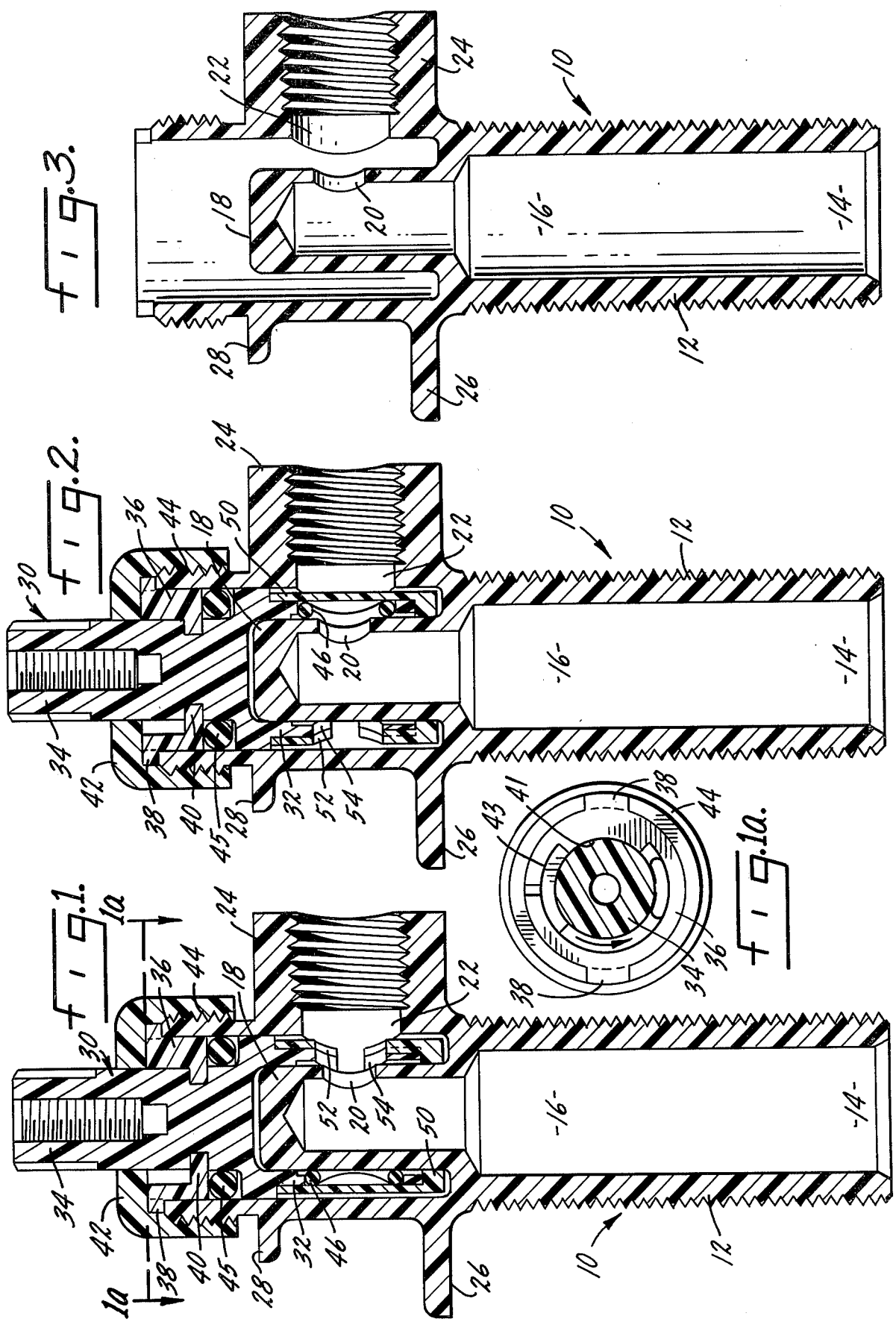

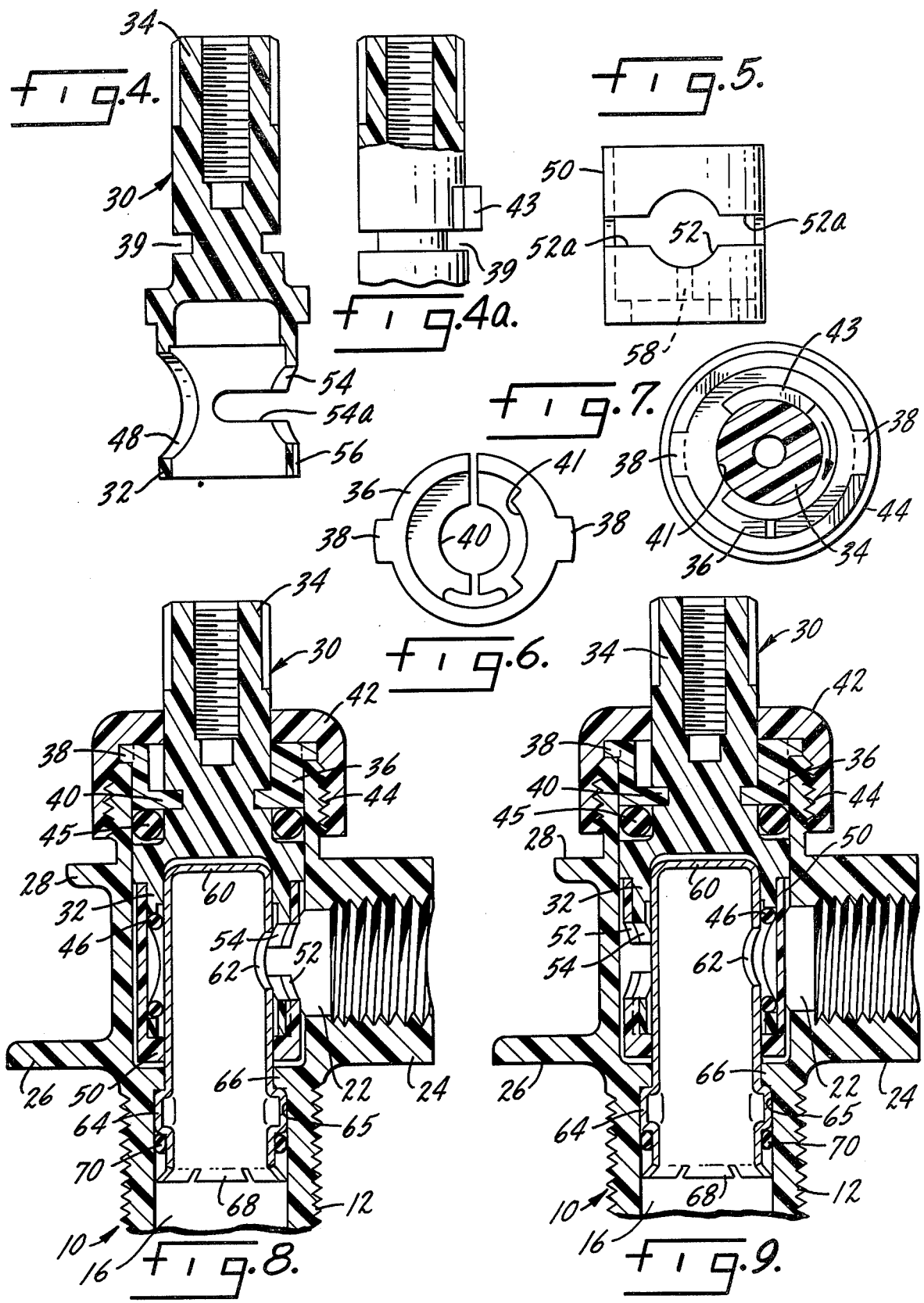

4,319,735

FAUCET VALVES

SUMMARY OF THE INVENTION

The present invention relates to valves and particularly to valves of the type usable in two handle faucets. The present invention is specifically a modification of the valve structure shown in my related co-pending application Ser. No. 925,538, filed July 19, 1978 now abandoned which in turn is a continuation-in-part of my previously-filed application Ser. No. 871,178, filed Jan. 23, 1978 now abandoned.

The valve of the present application is specifically concerned with providing a seal which forms a valve shutoff or closure but which seal is never itself a part of the path of flow thereby preventing the excessive pressures customarily associated with valve closure from being applied to the seal. Such pressures have been known to cause the seal to be blown out of the valve or to have the seal extruded outwardly from its seat area to such an extent that it is cut or abraded, thereby causing the valve to become what is known in the trade as a leaker.

One purpose of the invention is a valve structure of the type described in which valve shutoff is performed by a seal which is never itself a part of the path of flow through the valve.

Another purpose is a simply constructed reliably operable valve of the type described having a minimum number of parts, all or substantially all of which may be formed of a plastic material.

Another purpose is a valve structure of the type described utilizing an annular seal member or O-ring so retained as to form a valve closure but without the path of flow being through the O-ring.

Another purpose is a valve structure in which, by reversal of a single part, the direction of closing rotation is reversed.

Other purposes will appear in the ensuing specification, drawings and claims.

BRIEF DESCRIPTION OF THE DRAWINGS

The invention is illustrated diagrammatically in the following drawings wherein:

FIG. 1 is an axial section through a valve of the type described illustrating the valve in an open position, FIG. 1a is a section along plane 1a—1a of FIG. 1, FIG. 2 is an axial section, similar to FIG. 1, showing the valve in a closed position, FIG. 3 is an axial section through the sleeve or body of the valve structure, FIG. 4 is an axial section illustrating the valve member or stem, FIG. 4a is a partial side view of the stem at 90° to the position of FIG. 4, FIG. 5 is a side view of the seal retainer, FIG. 6 is a top plan view of the stop support, FIG. 7 is a section similar to FIG. 1a, but with the position of the stop member reversed, FIG. 8 is an axial section, similar to FIG. 1, illustrating a modified form of valve in the open position, and FIG. 9 is an axial section, similar to FIG. 1, but showing the modified form of valve in a closed position.

DESCRIPTION OF THE PREFERRED EMBODIMENT

Looking specifically at the valve structure of FIGS. 1–7, the valve includes a sleeve or body 10 having an elongated portion 12 which may be exteriorly threaded for connection to a conventional plumbing system. The valve structure shown herein has application as a kitchen or lavatory faucet or in a shower and/or tub combination. The invention should not be restricted to any specific plumbing application.

The elongated portion 12 has an inlet 14 which will direct water inwardly through a chamber 16 and into a cylindrical projection 18 which may, in the form of FIGS. 1–5, be integral with the sleeve or body 10. Projection 18 has a port 20 which is in register with a sleeve outlet 22 with the outlet being surrounded by a cylindrical boss 24.

The sleeve 10 may include a flange 26 which gradually merges with cylindrical boss 24 and a second smaller flange 28, again merging with cylindrical boss 24. Flanges 26 and 28 may be used in properly positioning and attaching the valve structure within a plumbing fixture.

A rotatable valve member or stem is indicated at 30 and has an inwardly-extending cylindrical projection 32 which is positioned within the annular chamber defined by the exterior of cylindrical projection 18 and the interior of the sleeve adjacent outlet 22. The stem 30 has a handle attaching portion 34 which will normally be accessible for some form of operating means. A stop support 36, shown in FIG. 6, has outwardly-directed lugs 38 which fit within mating grooves on the outward end of sleeve 10. The mating lugs and grooves properly position the stem for rotation relative to a closure seal ring described hereinafter. Stop support 36 has an inwardly-directed flange 40 which fits within a mating groove 39 in the stem, thereby holding the stem within the sleeve. The structure is assembled by means of a nut 42 which has an opening through which valve member portion 34 extends and which itself is in contact with an exterior of the stop support. The nut is threaded upon the exterior of the sleeve as particularly illustrated at 44.

Valve closure is provided by an annular seal ring 46 which is positioned within an annular opening 48 in the cylindrical projecting portion 32 of the valve member. The seal is held in place by a seal retainer 50, illustrated particularly in FIG. 5, and which in general is a cup-shaped member having a port 52 similar in size and configuration to a port 54 formed in the cylindrical projecting portion 32. Mating projection 56 and groove 58 on the valve member and retainer, respectively, maintain these elements in proper relationship. Both ports 52 and 54 have not only the customary circular portion, but have notches 52a and 54a, respectively, extending circumferentially therefrom, which notches perform a water modulation function in that they cause opening and closure of the valve to be more gradual than would normally be the case if only an annular or circular opening were present.

Referring specifically to FIGS. 1 and 2, FIG. 1 illustrates the open position of the valve and FIG. 2 the closed position. The path of flow in FIG. 1 is from sleeve inlet 14, through chamber 16 and then outwardly through radial port 20. Port 20 is in alignment with or in register with valve member and retainer ports 52 and 54 which in the open position are in register or alignment with outlet 22. Thus, water will flow in an unobstructed path from sleeve inlet 14 to its outlet 22. When the valve is to be closed stem or valve member 30 is rotated toward the closed position of FIG. 2. In the closed position note that seal ring 46 is coaxial with sleeve ports 20 and 22, but effectively forms a closure therebetween. The seal is backed by its retainer 50 and this combination forms a complete closure at the sleeve outlet.

Rotational movement of the stem relative to the sleeve is controlled by an arcuate stop 41 on the stop support and by an arcuate lug 43 on the exterior of the stem. This combination of elements permits 180° of rotation from closed to full open. By reversing the stop support 180°, FIG. 1a and FIG. 7, the direction of closing or opening valve movement is reversed. Thus, by reversal of a single part, stop member 36, valve operation is reversed whereby the entire valve structure has utility in faucet housings arranged for either clockwise or counterclockwise opening valve movement.

In no instance is the seal ring 46 a part of the path of flow from the inlet to the outlet. That is to say, at no time does water flow through the center of seal ring 46. Even when the seal ring is moving across aligned ports 20 and 22, such water as may be still flowing at that time will flow around the seal and at no time does water flow through it.

The above concept is important as it is well known in this art that seal rings which are positioned about an outlet port can come under enormous pressure just prior to valve closure. This is brought about because the size of the valve opening has been substantially restricted just prior to valve closure and yet there is no reduction in inlet pressure. Such enormous inlet pressures have been known to cause seal rings to simply pop out of their seat and pass through the valve itself. Such an event causes the valve to become completely useless as it can no longer be closed. In other instances it has been known for the pressure to cause the seal ring to extrude or be pushed outwardly from its seat to the point where the valve closing member cuts or abrades the seal causing the valve to become a leaker. The present invention is specifically directed to eliminating such pressures upon the seal and thereby preserving its integrity. The seal itself is never within or a part of the path of flow and therefore there is no pressure upon it which can cause it to be removed from its seat. In effect, the seal is so positioned that any pressure upon it during valve closure causes it to be more firmly held within its seat as such pressure will merely push the seal firmly against the retainer cup.

Stop support 36 in addition to controlling valve movement, as described above, functions as a thrust member. Pressure on stem 12 is applied to "O" ring 45 which is fixed in position by the stop support. The inwardly-directed flange 40 will take up all outward thrust within the inner diameter of the "O" ring. This particular arrangement reduces the rotational frictional forces between the opposing surfaces of flange 40 and groove 39.

Looking at the structure of FIGS. 8 and 9, like parts have been given like numbers. The only difference in the structure of FIGS. 8 and 9 over that shown in FIGS. 1 and 2 is that the integral cylindrical projection 18 of the sleeve has been replaced by a separate preferably stainless steel piston 60. The piston has a port 62 which functions the same as port 20. The piston is held within the sleeve by the combination of lugs 64 which fit within mating slots 65 in the sleeve, thus preventing rotational movement of the piston. Axial movement of the piston is prevented both by the described lugs and by a shoulder 66. The lugs are further effective to support an "O" ring 70. The end of projection or piston 60 may have an outwardly-flared area 68 with suitable notches which permit the outwardly-flared area to be in tight engagement with the interior of the sleeve.

The operation of the structure of FIGS. 8 and 9 is identical to that of the valve shown in FIGS. 1 and 2.

The valve shown in FIGS. 1 and 2 is formed substantially or completely of plastic or a suitable plastic-like material. No metal is used. The same is true in the structure of FIGS. 8 and 9, except that the piston or projection 60 may be formed of stainless steel or a similar material.

Whereas the preferred form of the invention has been shown and described herein, it should be realized that there may be many modifications, substitutions or alterations thereto.

The embodiments of the invention in which an exclusive property or privilege is claimed are defined as follows:

1. A valve structure including a sleeve having an inlet and an outlet and a flow path therebetween, a rotatable valve member positioned within said sleeve and having a portion movable in surrounding relation about said inlet and between said inlet and outlet, said valve member portion having an opening therein movable to a position within said flow path and adjacent said sleeve outlet to connect said sleeve inlet and outlet, and seal means carried on the inside of said valve member portion and spaced circumferentially from said opening, said seal means being rotatable about said inlet to a position adjacent said outlet and downstream of said inlet closing communication between said sleeve inlet and outlet, with pressure from said inlet being directed against said seal urging it into closing position only when said seal is in substantial register with said outlet, said path of flow never being through said seal means at any position of said movable valve member.

2. The structure of claim 1 further characterized in that said seal means is annular in form and is carried by a retainer movable with said valve member.

3. A valve structure including a sleeve having an inlet and a radial outlet and a flow path therebetween, said sleeve including a cylindrical projection and a port in said projection in register with said outlet, a rotatable valve member having a portion extending within an annular chamber formed between said port and outlet, said valve member having an opening movable to a position adjacent said outlet and downstream of said inlet and port to connect said outlet and port, and an annular seal member fixed on the inside of said valve member and circumferentially spaced from said opening, said seal member being in contact with the exterior of said projection and being movable to a position downstream of said port and inlet closing communication between said outlet and port, the pressure from said inlet and port being directed against said seal urging it into closing position only when said seal is in substantial register with said outlet, with said seal member never being within said path of flow at any position of said valve member.

4. The structure of claim 3 further characterized in that said projection is integral with said sleeve.

5. The structure of claim 4 further characterized in that said integral projection exterior surface and the interior of said sleeve adjacent said outlet define said annular chamber.

6. The structure of claim 3 further characterized in that said projection is a separate element attached to said sleeve on the inside thereof.

7. The structure of claim 3 further characterized in that said valve member includes a stem portion extending outwardly from said sleeve and adapted to receive an actuating member.

8. The structure of claim 3 further characterized in that said seal member is disposed such that its diameter is generally perpendicular to the axis of rotation of said valve member, and a retainer extending about said valve member to hold said seal member in a fixed position on said valve member.

9. The structure of claim 8 further characterized by and including an opening in said retainer in alignment with said valve member opening.

10. The structure of claim 3 further characterized by and including means limiting rotation of said valve member.

11. The structure of claim 10 further characterized in that said means limiting rotation includes a stop support interacting between said sleeve and valve member.

12. The structure of claim 11 further characterized in that said stop support includes a stop, and a cooperating lug on said valve member.

13. The structure of claim 12 further characterized in that reversal of said stop support reverses the direction of valve member opening movement.

* * * * *